United States Patent
Zimmermann et al.

(10) Patent No.: US 6,475,273 B1
(45) Date of Patent: Nov. 5, 2002

(54) COLOR EFFECT MATERIALS AND PRODUCTION THEREOF

(75) Inventors: Curtis J. Zimmermann; Vivian K. Doxey, both of Cold Spring; Daniel S. Fuller, Beacon, all of NY (US)

(73) Assignee: Engelhard Corporation, NJ (US)

( * ) Notice: Subject to any disclaimer, the term of this patent is extended or adjusted under 35 U.S.C. 154(b) by 80 days.

(21) Appl. No.: 09/669,608

(22) Filed: Sep. 26, 2000

(51) Int. Cl.[7] ................................................. C04B 1/32
(52) U.S. Cl. ........................ 106/415; 106/436; 106/453; 106/456
(58) Field of Search ................................ 106/415, 436, 106/453, 456

(56) References Cited

U.S. PATENT DOCUMENTS

| | | | |
|---|---|---|---|
| 3,438,796 A | 4/1969 | Hanke | 106/291 |
| 4,434,010 A | 2/1984 | Ash | 106/291 |
| 5,030,445 A | 7/1991 | Hashimoto et al. | 424/59 |
| 5,059,245 A | 10/1991 | Phillips et al. | 106/22 |
| 5,135,812 A | 8/1992 | Phillips et al. | 428/403 |
| 5,171,363 A | 12/1992 | Phillips et al. | 106/22 |
| 5,279,657 A | 1/1994 | Phillips et al. | 106/22 |
| 5,281,480 A | 1/1994 | Phillips et al. | 428/412 |
| 5,624,486 A | 4/1997 | Schmid et al. | 106/404 |
| 5,648,165 A | 7/1997 | Phillips et al. | 428/346 |
| 5,766,335 A | 6/1998 | Bujard et al. | 106/404 |
| 5,766,738 A | 6/1998 | Phillips et al. | 428/200 |
| 5,958,125 A | 9/1999 | Schmid et al. | 106/417 |
| 6,013,370 A | 1/2000 | Coutler et al. | 428/403 |
| 6,136,083 A | 10/2000 | Schmidt et al. | 106/403 |
| 6,150,022 A | 11/2000 | Coutler et al. | 428/403 |
| 6,157,489 A | 12/2000 | Bradley, Jr. et al. | 359/584 |
| 6,325,847 B1 * | 12/2001 | Christie et al. | 106/403 |

FOREIGN PATENT DOCUMENTS

| | | |
|---|---|---|
| EP | 0313281 | 4/1989 |
| EP | 0 708 154 A2 | 4/1996 |
| EP | 0 950 693 A1 | 10/1999 |
| WO | 97/39066 A1 | 4/1997 |
| WO | 01/40383 A1 | 6/2000 |

OTHER PUBLICATIONS

International Search Report (in English) issued Mar. 8, 2001 in a related application.

* cited by examiner

*Primary Examiner*—Elizabeth D. Wood
(74) *Attorney, Agent, or Firm*—Dickstein, Shapiro, Morin & Oshinsky, L.L.P.

(57) ABSTRACT

A color effect material is composed of a plurality of encapsulated substrate platelets in which each platelet is encapsulated with a first layer selected from the group consisting of silicon, aluminum, titanium nitride and mixtures thereof, which acts as a reflector to light directed thereon, a second layer encapsulating the first layer in which the second layer provides a variable pathlength of light dependent on the angle of incidence of light impinging thereon and a third layer being selectively transparent to light directed thereon.

40 Claims, No Drawings

COLOR EFFECT MATERIALS AND PRODUCTION THEREOF

BACKGROUND OF THE INVENTION

Optically variable pigments have been described in the patent literature since the 1960s. Hanke in U.S. Pat. No. 3,438,796 describes the pigment as being "thin, adherent, translucent, light transmitting films or layers of metallic aluminum, each separated by a thin, translucent film of silica, which are successively deposited under controlled conditions in controlled, selective thicknesses on central aluminum film or substrate". These materials are recognized as providing unique color travel and decorative optical color effects.

The recent approaches to optically variable pigments have generally adopted one of two techniques. In the first, a stack of layers is provided on a temporary substrate which is often a flexible web. The layers are generally made up of aluminum, chromium, magnesium fluoride and silicon dioxide. The stack of film is separated from the substrate and subdivided into appropriately dimensioned flakes. The pigments are produced by physical techniques such as physical vapor deposition onto the substrate, separation from the substrate and subsequent comminution or by other. deposition techniques (plasma, sputtering etc.), subsequent deflaking of the decomposition product, etc. In the pigments obtained in this way, the central layer and all other layers in the stack are not completely enclosed by the other layers. The layered structure is visible at the faces formed by the process of comminution.

In the other approach, a platelet shaped opaque metallic substrate is coated or encapsulated with successive layers of selectively absorbing metal oxides and non-selectively absorbing layers of carbon, metal sulfide, metal and/or metal oxide. To obtain satisfactory materials using this approach, the layers are applied by multiple techniques such as chemical vapor deposition and/or sol-gel processes. A major shortcoming of this is that traditional metal flakes usually have structural integrity problems, hydrogen outgassing problems and other pyrophoric concerns.

The prior art approaches suffer from additional disadvantages. For instance, certain metals or metal flake such as chromium, aluminum, copper, brass and bronze may have perceived health and environmental impacts associated with their use. The minimization of their use in optical effect materials should be advantageous due to their perceived impact.

SUMMARY OF THE INVENTION

The present invention provides a color effect material (CEM) comprising a platelet-shaped substrate encapsulated with:(a) a highly reflective first layer to light directed thereon and being selected from the group consisting of silicon, aluminum, titanium nitride and mixtures thereof; and (b) a second layer encapsulating the first layer and providing a variable pathlength for light dependent on the angle of incidence of light impinging thereon in accordance with Snell's Law; and (c) a selectively transparent third layer to light directed thereon. CEM's provide optically variable pigment attributes as well as additional non-decorative effects such as conductivity, EMI/RFI shielding and/or desirable tactile properties.

DESCRIPTION OF THE INVENTION

It is an object of the present invention to provide novel CEM's which can also be prepared in a reliable and reproducible manner. This object is achieved by a CEM comprising a platelet-shaped substrate encapsulated with:(a) a highly reflective first layer to light directed thereon; and (b) a second layer encapsulating the first layer in which the second layer consists of a low index of refraction material, typically a refractive index from 1.3 to 2.5 and more specifically between 1.4 and 2.0 that provides a variable path length for light dependent on the angle of incidence of light impinging thereon; and (c) a selective transparent third layer to light directed thereon. The degree of reflectivity for the first encapsulating layer should be from 100% to 5% reflectivity, whereas the selective transparency of the third encapsulating layer should be from 5% to 95% transmission. More specifically, one would prefer to have 50–100% reflectivity and 50–95% transparency for the first and third encapsulating layers, respectively. The degree of reflectivity and transparency for different layers can be determined by measuring a variety of methods such as ASTM method E1347-97, E1348-90 (1996) or F1252-89 (1996). The substrate can be mica, aluminum oxide, bismuth oxychloride, boron nitride, glass flake, iron oxide-coated mica (ICM), iron oxide coated glass flake, silicon dioxide and titanium dioxide-coated mica, titanium dioxide coated glass flake (TCM), variations of the above-mentioned substrate, or any encapsulatable smooth platelet. The first and third layers can be the same or different materials, i.e., aluminum, silicon, titanium nitride or mixtures thereof.

Preferably, all the layers are deposited onto any particulate substrate by chemical vapor deposition (CVD) from an appropriate precursor (The Chemistry of Metal CVD, edited by Toivo T. Kodas and Mark J. Hampden-Smith; VCH Verlagsgesellschaft mbH, D-69451 Weinheim, 1994, ISBN 3–527-29071-0). In this case, there is a particular advantage over the prior art in that the products of the present invention can be produced in a reactor without having to be removed during stages of the preparation for additional processing. The CVD reactor can handle the coating of all the layers, calcining, and exterior treatments without the powder substrate being removed from the reactor until completion. No additional processing or comminution of the material is necessary for obtaining the desired final particle size and/or effect product.

The products of the present invention are useful in automotive, cosmetic, industrial or any other application where metal flake, pearlescent pigments, or optically variable pigments are traditionally used.

The size of the platelet-shaped substrate is not critical per se and can be adapted to the particular use. In general, the particles have average largest diameters of about 2–250 $\mu$m, in particular 5–100 $\mu$m. Their specific free surface area (BET) is in general from 0.1 to 25 m$^2$/g.

The CEM's of the invention are notable for multiple encapsulation of the platelet-shaped substrate.

The first encapsulating layer which is made of the group consisting of silicon, aluminum and titanium nitride, or their mixtures is highly reflective to light directed thereon.

The thickness of the first encapsulating layer is not critical so long as it is sufficient to make the layer highly reflective. If desirable, the thickness of the first layer can be varied to allow for selective transmission of light. When silicon is selected as the component of the first layer, the thickness must be at least about 20–100 nm, preferably from about 30 to 75 nm. However, when aluminum is used, the thickness must be at least about 10–90 nm, preferably from about 20 to 65 nm. The thickness of titanium nitride as the first layer must be at least about 15–95 nm, preferably from about 15 to 60 nm. A thickness outside of the above-mentioned ranges can also be utilized depending on the desired effect. The quantity of the coating will be directly related to the surface area of the particular substrate being utilized.

The second encapsulating layer must provide a variable pathlength for light dependent on the angle of incidence of light impinging thereon and therefore, any low index of refraction material that is visibly transparent may be utilized. Preferably, the second layer is selected from the group consisting of silicon dioxide ($SiO_2$), suboxides of silicon dioxide ($SiO_{0.25}$ to $SiO_{1.95}$) or magnesium fluoride.

The thickness of the second encapsulating layer varies depending on the degree of color travel desired. In addition, the second encapsulating layer will have a variable thickness depending on a variety of factors, especially refractive index. Materials having a refractive index around 1.5 tend to require a film thickness of a few hundred nanometers for generation of unique extensive color travel. For instance, a second layer has a preferable thickness of about 75 to 500 nm for silicon dioxide and for magnesium fluoride. A thickness below this range will result in limited color travel, which may be desirable for specific applications.

In one embodiment, the second layer is encapsulated by a selectively-transparent third layer that allows for partial reflection of light directed thereon. Preferably, the third layer is selected from the group consisting of silicon, iron oxide, chromium oxide, titanium dioxide, titanium nitride, a mixed metal oxide, aluminum and mixtures thereof.

Of course, the third layer can also contribute to the interference of the pigment. Its thickness can vary but must always allow for partial transparency. For instance, a third layer has a preferable thickness of about 5 to 20 nm for silicon; about 2 to 15 for aluminum; about 1–15 nm for titanium nitride; about 10 to 60 for iron oxide; about 10 to 60 for chromium oxide; about 10–100 nm for titanium dioxide and about 5 to 100 nm for a mixed metal oxide, or mixtures thereof.

All the layers of the CEM of the invention are altogether notable for a uniform, homogeneous, film-like structure that results from the manner of preparation according to the invention.

In the novel process for preparing the encapsulated platelet-like substrates, the individual coating steps are each effected by reaction or thermal decomposition of suitable starting compounds in the presence of the substrate particles to be coated. For instance, silicon can be deposited from silane ($SiH_4$), alkyl and aryl substituted silanes (R—$SiH_3$), and halogen substituted silanes such as trichlorosilane, dichlorosilane and chlorosilane. Some additional precursors to forming silicon include 1,2-disilylethane, disilylmethane, t-butylsilane, bis(t-butyl)silane and phenylsilane. Analogs of these mentioned compounds can be used as well. Numerous aluminum precursors exist such as the dialkyl aluminum hydrides, trialkyl aluminums and Lewis base stabilized alanes (L-$AlH_3$). Some specific examples include dimethyl aluminum hydride, tri-isobutyl aluminum, trimethylamine:alane, ethyldimethylamine:alane and N-methylpyrrolidine:alane; silicon dioxide from a compound selected from the group consisting of silicon tetraalkoxides such as tetraethoxysilane, di-t-butoxydiacetoxysilane and silicon tetrachloride; titanium nitride from titanium tetrachloride and the dialkyl amides of titanium such as tetrakis(dimethyl-amido) titanium (TDMAT) and tetrakis(diethyl-amido) titanium (TDEAT); iron oxide from an iron carbonyl, iron chloride and iron sulfates; and chromium oxide from a chromium chloride, chromium sulfates and chromium carbonyl.

The coating of each of the layers is preferably carried out in a heatable fluidized bed reactor, as described for example in EP-A-33 457 or DE-A-38 13 335, where the uncoated or already singly or doubly coated substrate particles are initially fluidized in a fluidizing gas and heated to the temperature sufficient for decomposing the particular precursor compound. For instance, the temperature sufficient for reacting or decomposing silicon precursors for silicon deposition is about 400 to 750°C.; for reacting or decomposing aluminum precursors for aluminum deposition, about 200 to 400°C.; for reacting or decomposing titanium nitride precursors for titanium nitride deposition, about 300 to 800°C.; for reacting or decomposing iron oxide precursors for iron oxide, about 70 to 200°C.; for reacting or decomposing titanium dioxide precursors for titanium dioxide deposition, about 150 to 350°C.; and for reacting or decomposing silicon dioxide precursors for silicon dioxide deposition, about 100 to 550° C. All the reaction or decomposition temperatures are precursor and reactor specific. The vaporized precursor compounds and any gases required for achieving the reaction or decomposition are then introduced via separate nozzles.

Each of the layers is deposited by reacting or decomposing precursor compounds as indicated hereinabove, preferably alkyl and aryl substituted silanes, dialkylaluminum hydrides, trialkylaluminums, Lewis base stabilized alanes and chlorides, tetradialkyl amidotitanium, carbonyls, and alkoxides, such as phenoxides and benzyl alkoxides but also aliphatic alkoxides, in particular ethoxides. A variety of inert carrier gas systems can be utilized for the silicon and aluminum precursors such as nitrogen, helium and argon. Pure oxygen, hydrogen and/or air can be utilized to react and/or decompose these materials depending on the desire for an oxidizing or reducing atmosphere. Similar carrier gases would be utilized for the titanium nitride precursors, however, ammonia gas ($NH_3$) is typically utilized as one of the gases for reacting or decomposing such precursors to form titanium nitride. Iron carbonyl is transported to the reaction zone in an inert carrier gas such as nitrogen or helium and in some instances may contain some, or exclusively be, carbon monoxide gas. The carbonyl is reacted or decomposed by addition of oxygen and/or air at the reaction zone resulting in the deposition of iron oxide on the particulate surface whereas the alkoxides are hydrolyzed by air and/or water vapor. The oxygen or water vapor must be supplied in an amount which is at least that required stoichiometrically for forming the desired oxide or, in the case of the carbonyls, carbon dioxide, but it is also possible to use a small excess. The fluidizing gas used in this coating operation can be not only nitrogen but also air depending on the reactivity of the precursor reagents.

All the coating operations are advantageously carried out by vaporizing the precursor compounds in a vaporizer upstream of the reactor and transporting the resulting vapors into the reactor by means of a carrier gas, in general air, nitrogen, hydrogen/nitrogen mixtures, or other gases, depending on the reaction conditions required.

To obtain homogeneous layers that encapsulate the substrate uniformly and completely, the gas quantity of the precursor compound should in general preferably not be more than 5% by volume, more preferably not more than 2% by volume, of the total quantity of gas in the reactor. Depending on the deposition efficiency, it may be necessary to greatly increase the concentration of the precursor compound in the total quantity of gas.

As indicated hereinabove, the product need not be isolated between different coating operations; on the contrary, a further coating operation can advantageously be carried out immediately after a previous coating operation in the same reactor, if desired after a small reduction in temperature and if necessary after the substitution of a different fluidizing gas, or precursor compound carrier gas.

If the applied layer is a metal or a low metal oxide, which is to form the outer layer of the particulate, it is advantageous to mix air into the fluidizing gas during cooling in order that the layer surface may be passivated by oxidation. The cooled product is then discharged in the usual manner.

The process of the invention makes it possible to prepare multiply coated CEM's in a simple manner. The thickness of the layers produced can be set specifically and reproducibly to the desired value via the coating time, the concentration of precursor compound used and the ratio of initially charged particles to added precursor compound. The CEM's obtained in this way are notable for the high quality of the coating, i.e. for homogeneous, uniform layers encapsulating the substrate particles in a film fashion.

The color effect materials (CEM's) of the invention are advantageous for many purposes, such as the coloring of paints, printing inks, plastics, glasses, ceramic products and decorative cosmetic preparations. Their special functional properties make them suitable for many other purposes. The CEM's, for example, could be used in electrically conductive or electromagnetically screening plastics, paints or coatings or in conductive polymers. The conductive functionality of the CEM's makes them of great utility for powder coating applications.

The above mentioned compositions in which the compositions of this invention are useful are well known to those of ordinary skill in the art. Examples include printing inks, nail enamels, lacquers, thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile.

Due to its good heat resistance, the pigment is particularly suitable for the pigmenting of plastics in the mass, such as, for example, of polystyrene and its mixed polymers, polyolefins, in particular polyethylene and polypropylene and the corresponding mixed polymers, polyvinyl chloride and polyesters in particular polyethylene glycol terephthalate and polybutylene terephthalate and the corresponding mixed condensation products based on polyesters.

For a well rounded introduction to a variety of pigment applications, see Temple C. Patton, editor, The Pigment Handbook, volume II, Applications and Markets, John Wiley and Sons, New York (1973). In addition, see for example, with regard to ink: R. H. Leach, editor, The Printing Ink Manual, Fourth Edition, Van Nostrand Reinhold (International) Co. Ltd., London (1988), particularly pages 282–591; with regard to paints: C. H. Hare, Protective Coatings, Technology Publishing Co., Pittsburg (1994), particularly pages 63-288. The foregoing references are hereby incorporated by reference herein for their teachings of ink, cosmetic, paint and plastic compositions, formulations and vehicles in which the compositions of this invention may be used, however not limited to, including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an automotive paint formulation along with other pigments which may include titanium dioxide, acrylic latices, coalescing agents, water or solvents. The pigment may also be used, for example, at a level of 20 to 30% in a plastic color concentrate in polyethylene.

EXAMPLE 1

Procedure for Preparation of Silicon Based CEM According to the Invention

A silicon based CEM is prepared in an externally heatable fluidized bed reactor made of stainless steel having a diameter of 15 cm and a height of 152 cm, and equipped with a sintered metal bottom plate (fluidization plate) and porous metal filters. The fluidization gas is delivered to the reactor through the bottom sintered metal plate. Reactants and additional fluidization gases are additionally introduced into the reactor through side inlet ports.

A) 450 grams of mica having an average particle size of 20 microns (major dimension) is placed in the bottom of the fluidized bed reactor on top of the sintered metal distributor plate. Nitrogen fluidization gas is introduced through the sintered metal bottom plate at ≈100 standard cubic feet per hour (SCFH) resulting in aerosolization of the particulate substrate. The fluidized bed reactor is electrically heated to 525° C. T-butyl silane is passed through a vaporizer maintained at 50° C. with a nitrogen carrier gas flow of 5 SCFH. After vaporization, the t-butyl silane vapor and carrier gas is pressure injected into a side inlet port containing an additional 70 SCFH of nitrogen carrier gas where complete mixing takes place. Under the above conditions, the silicon precursor is added at 0.3 grams/minute through side ports above the fluidization plate. The concentration of the t-butyl silane is 9% by weight in the nitrogen carrier gas. Due to the temperature of the reactor and the oxidizing surface chemistry of the mica, the silicon precursor decomposes and deposits elemental silicon on the surface of the mica. A sample of the silicon coated mica is educted from the reactor and evaluated for reflectivity of incident radiation and bulk color. The mica substrate is encapsulated with a first layer of silicon resulting in an opaque decorative particulate.

B) The fluidized bed reactor is then raised in temperature to 550° C. and the fluidization gas through the distributor plate is changed to air with a small quantity of water vapor being injected. Tetraethoxy silane (TEOS) is passed through a vaporizer maintained at 170° C. with a nitrogen carrier gas flow of 5 SCFH. After vaporization, the TEOS vapor and carrier gas is pressure injected into a side inlet port containing an additional 67 SCFH of nitrogen carrier gas where complete mixing takes place. Under the above conditions, the silicon dioxide precursor is added at 1.0 grams/minute through side ports above the fluidization plate. The TEOS/water vapor ratio is 2.0. Due to the temperature of the reactor, the oxidizing gas atmosphere and the oxidizing surface chemistry of the mica, the silicon dioxide precursor hydrolyzes and deposits silicon dioxide on the surface of the silicon encapsulated mica. The silicon dioxide is the second encapsulating layer of the composite CEM.

C) The fluidized bed reactor is cooled back down to 525° C. and all gases are changed over to nitrogen. A third encapsulating selectively transparent film of silicon is coated on the second encapsulating layer of silicon dioxide in accordance with the above procedure. The reactor is cooled to room temperature and the multilayer encapsulated composite particulate material is removed and evaluated for reflectivity of incident radiation and bulk color.

EXAMPLE 2

Procedure for Preparation of Silicon Based CEM According to the Invention

A silicon based CEM is prepared in accordance with example 1 utilizing a titanium dioxide coated mica substrate known commercially as Mearlin Hi-Lite Pearl.

EXAMPLE 3

Procedure for Preparation of Aluminum Based CEM According to the Invention

An aluminum based CEM is prepared in an externally heatable fluidized bed reactor in accordance with example 1.

450 grams of mica having an average particle size of 20 microns (major dimension) is placed in the bottom of the fluidized bed reactor on top of the sintered metal distributor plate. Nitrogen fluidization gas is introduced through the sintered metal bottom plate at 128 SCFH resulting in aerosolization of the particulate substrate. The fluidized bed reactor is electrically heated to 350° C. A mixture of 25% triisobutyl aluminum (TIBA) in toluene is passed through a vaporizer maintained at 160° C. with a nitrogen carrier gas flow of 10 SCFH. After vaporization, the TIBA/toluene vapor and carrier gas is pressure injected into a side inlet port containing an additional 84 SCFH of nitrogen carrier gas where complete mixing takes place. Under the above conditions, the aluminum precursor solution is added at 2.6 grams/minute through side ports above the fluidization plate. The concentration of the TIBA is 10% by weight in the nitrogen carrier gas. Due to the temperature of the reactor and the oxidizing surface chemistry of the mica, the aluminum precursor decomposes and deposits elemental aluminum on the surface of the mica. A sample of the aluminum coated mica is educted from the reactor and evaluated for reflectivity of incident radiation and bulk color. X-ray analysis confirms crystalline aluminum is deposited on the mica. The mica substrate is encapsulated with a first layer of aluminum resulting in an opaque decorative particulate.

The fluidized bed reactor is then raised in temperature to 550° C. and a small quantity of oxygen is introduced into the fluidized bed to allow for some surface oxidation (passivation) of the aluminum encapsulated mica surface. The fluidization gas through the distributor plate is then changed to air with a small quantity of water vapor being injected. Tetraethoxy silane (TEOS) is passed through a vaporizer maintained at 170° C. with a nitrogen carrier gas flow of 5 SCFH. After vaporization, the TEOS vapor and carrier gas is pressure injected into a side inlet port containing an additional 67 SCFH of nitrogen carrier gas where complete mixing takes place. Under the above conditions, the silicon dioxide precursor is added at 1.0 grams/minute through side ports above the fluidization plate. The TEOS/water vapor ratio is ≈2.0. Due to the temperature of the reactor, the oxidizing gas atmosphere and the oxidizing surface chemistry of the mica, the silicon dioxide precursor hydrolyzes and deposits silicon dioxide on the surface of the aluminum encapsulated mica. The silicon dioxide is the second encapsulating layer of the composite CEM.

The fluidized bed reactor is cooled back down to 350° C. and all gases are changed over to nitrogen. A third encapsulating selectively transparent film of aluminum is coated on the second encapsulating layer of silicon dioxide in accordance with the above procedure. The reactor is cooled to room temperature and the multilayer encapsulated composite particulate material is removed and evaluated for reflectivity of incident radiation and bulk color.

EXAMPLE 4

Procedure for Preparation of Aluminum Based CEM According to the Invention

An aluminum based CEM is prepared in accordance with example 3 utilizing a titanium dioxide coated mica substrate known commercially as Mearlin Hi-Lite Pearl.

EXAMPLE 5

Procedure for Preparation of Titanium Nitride Based CEM According to the Invention A TiN based CEM is prepared in an externally heated fluidized bed reactor as described in Example 1. 450 grams of mica having an average particle size of 20 microns (major dimension) is placed in the bottom of the fluidized bed reactor on top of the distributor plate. The bed is fluidized with $N_2$ and heated to 850° C. $NH_3$ is introduced through the distributor plate in place of the $N_2$ although make-up $N_2$ can be added to the ammonia to obtain the desired amount of $NH_3$ and fluidization. (The ratio of $N_2/H_2$ is maintained at 1:1). The combined flow rate of the distributor gas(es) is ~56 SCFH. Titanium tetrachloride (TICL) is added at 115 g/hr by adjusting the TICL saturator temperature and $N_2$ flow through the side reactor inlet. The total nozzle flow through the inlet is 52 SCFH. Samples with the TiN coating are educted and evaluated for opacity, reflectivity and color. The $TiCl_4$ and $NH_3$ addition are continued until the desired affect is achieved.

EXAMPLE 6

Procedure for Preparation of Titanium Nitride Based CEM According to the Invention 450 g of mica having an average particle size of 20 microns (major dimension) is placed in the bottom of the fluidized bed reactor on top of the sintered metal distributor plate as described in example 1. The bed is fluidized with $N_2$ and heated to 450° C. $N_2$ is introduced through the distributor plate although $NH_3$ can be added as well to reduce carbon inclusion in the film. The total flow through the distributor at is 110 SCFH. Tetrakis(dimethyl-amido) titanium (TDMAT) is passed through a vaporizer maintained at 50° C., with a carrier gas flow of 5–10 SCFH. After vaporization, the TDMAT is pressure injected into a side inlet port containing an additional 72–77 SCFH of $N_2$ carrier gas where complete mixing takes place. Under the above conditions, the TiN precursor is added at approximately 2 g/min through side ports above the fluidization plate and TiN is deposited on the surface of the mica.

The fluidized bed temperature is reduced to 200° C. The nitrogen flow through the distributor plate is switched over to air/water vapor. The combined flow rate of the air and water vapor through the distributor plate is 156 SCFH and is used to maintain fluidization of the particles. The amount/rate of water vapor added is adjusted according to the amount/rate of TICL added. Typically the TICL/water vapor ratio is 0.15. TICL is added at 420 g/hr by adjusting the TICL saturator temperature and $N_2$ flow through the side reactor inlet. The total nozzle flow of TICL and $N_2$ through the inlet is 123 SCFH. Hydrolysis of the TICL in the presence of the particulate results in a titanium dioxide encapsulation of the TiN coated mica. Samples with the titanium dioxide/TiN/mica encapsulation are educted and evaluated for opacity, reflectivity and color. The TICL addition is continued to an optical thickness that gives the desired color effect.

EXAMPLE 7

Procedure for Preparation of Titanium Nitride Based CEM According to the Invention A TiN encapsulated mica substrate is prepared in accordance with Example 5. The fluidized bed temperature is then reduced to 200° C. The $N_2$ fluidization gas is introduced through the sintered metal bottom plate at 168 SCFH. Iron pentacarbonyl (IPC) is passed through a vaporizer maintained at 140° C. with a N2 gas flow of 5 SCFH. After vaporization, the IPC vapor and carrier gas is pressure injected into a side inlet port containing an additional 119 SCFH where complete mixing takes place. Under the above conditions, the IPC precursor is added at 3.2 g/min through side ports above the fluidization plate. The IPC decomposes in the reactor and encapsulates the TiN coated particulate material with iron oxide. Samples with the iron oxide/TiN/mica encapsulation are educted and evaluated for opacity, reflectivity and color. The IPC addition is continued until the desired geometric encapsulation thickness and optical effect is achieved.

EXAMPLE 8

Procedure for Preparation of Titanium Nitride Based CEM According to the Invention A TiN based material is prepared in accordance with example 6. A final selectively transparent layer of TiN is encapsulated around the composite particulate material.

EXAMPLE 9

Procedure for Preparation of Titanium Nitride Based CEM According to the Invention A TiN based material is prepared in accordance with example 7. A final selectively transparent layer of titanium nitride is encapsulated around the composite particulate material.

EXAMPLE 10

A CEM prepared in accordance with example 1A. A final selectively transparent layer of iron oxide is encapsulated around the composite particulate material.

EXAMPLE 11

A CEM prepared in accordance with example 1A. A final selectively transparent layer of titanium dioxide is encapsulated around the composite particle material.

EXAMPLE 12

A CEM prepared according to example 1A, B and C is incorporated into polypropylene step chips at 1% concentration. The step chips are appropriately named since they have graduating thickness at each step across the face of the chip. The graduating steps allow one to examine the different effect of the alloy CEM based on polymer thickness.

EXAMPLE 13

A CEM prepared according to example 3 is incorporated into a nail enamel. 10g of the CEM is mixed with 82 g of suspending lacquer SLF-2, 4 g lacquer 127P and 4 g ethyl acetate. The suspending lacquer SLF-2, 4 g lacquer 127P and 4 g ethyl acetate. The suspending lacquer SLF-2 is a generic nail enamel consisting of butyl acetate, toluene, nitrocellulose, tosylamide/formaldehyde resin, isopropyl alcohol, dibutyl phthalate, ethyl acetate, camphor, n-butyl alcohol and silica.

EXAMPLE 14

A 10% by weight CEM from example 3 is sprayed in a polyester TGIC powder coating from Tiger Drylac using a PGI corona Gun #110347.
1. The CEM is mixed in a clear polyester system and sprayed over a RAL 9005 black powder sprayed base.
2. The CEM is mixed into a RAL 9005 black pigmented polyester powder. The color effect material is highly attracted to the ground metal panel due to its electrical properties. Additionally, due to its high affinity to orient closely to the surface that resulted in a finish that has a high distinctness of image (DOI) it does not require an additional clear coat to reduce protrusion often caused by traditional pearlescent and metal flake pigments.

EXAMPLE 15

A 10% dispersion of the CEM prepared according to example 1 is mixed into a clear acrylic urethane basecoat clearcoat paint system DBX-689 (PPG) along with various PPG tints to achieve desired color. The tint pastes consist of organic or inorganic colorants dispersed at various concentrations in a solventborne system suitable with the DMD Deltron Automotive Refinish paint line from PPG. The complete formulation is sprayed using a conventional siphon feed spraygun onto 4X12" curved automotive type panels supplied by Graphic Metals. The panel is clear coated with PPG 2001 high solids polyurethane clear coat and air dried.

What is claimed is:

1. A color effect material comprising a platelet-shaped substrate encapsulated with:
   (a) a highly reflective first layer to light directed thereon; and being selected from the group consisting of silicon, aluminum, titanium nitride and mixtures thereof; and
   (b) a second layer encapsulating the first layer and providing a variable pathlength for light dependent on the angle of incidence of light impinging thereon; and
   (c) a third layer encapsulating the second layer which is selectively transparent to light directed thereon.

2. The color effect material of claim 1, wherein the substrate is selected from the group consisting of mica, aluminum oxide, bismuth oxychloride, boron nitride, glass flake, iron oxide-coated mica, iron oxide-coated glass flake, silicon dioxide and titanium dioxide-coated mica and titanium dioxide-coated glass flake.

3. The color effect material of claim 1, wherein all the layers are deposited by chemical vapor deposition.

4. The color effect material of claim 1, wherein the first encapsulating layer is selected from the group consisting of silicon, titanium nitride, and aluminum.

5. The color effect material of claim 1, wherein the first encapsulating layer is silicon.

6. The color effect material of claim 5, wherein the silicon is deposited by chemical vapor deposition from an alkyl-substituted silane.

7. The color effect material of claim 6, wherein the alkylsubstituted silane is 1,2-disilylethane.

8. The color effect material of claim 1, wherein the first layer is aluminum.

9. The color effect material of claim 8, wherein the aluminum is deposited by chemical vapor deposition from an aluminum alkyl.

10. The color effect material of claim 9, wherein the aluminum alkyl is tri-isobutyl aluminum.

11. The color effect material of claim 1, wherein the second encapsulating layer is selected from the group consisting of silicon dioxide, suboxides of silicon dioxide and magnesium fluoride.

12. The color effect material of claim 11, wherein the second encapsulating layer is silicon dioxide.

13. The color effect material of claim 11, wherein the second encapsulating layer is a suboxide of silicon dioxide.

14. The color effect material of claim 11, wherein the second encapsulating layer is magnesium fluoride.

15. The color effect material of claim 12, wherein the silicon dioxide is deposited by chemical vapor deposition from a compound selected from the group consisting of silicon tetrachloride, tetraethoxysilane and dichlorosilane.

16. The color effect material of claim 1, wherein the third encapsulating layer is selected from the group consisting of silicon, iron oxide, chromium oxide, titanium dioxide, titanium nitride, a mixed metal oxide, aluminum and mixtures thereof.

17. The color effect material of claim 16, wherein the third encapsulating layer is silicon.

18. The color effect material of claim 17, wherein the silicon is deposited by chemical vapor deposition from 1,2-disilylethane or t-butyl silane.

19. The color effect material of claim 16, wherein the third encapsulating layer is iron oxide.

20. The color effect material of claim 19, wherein the iron oxide is deposited by chemical vapor deposition from an iron carbonyl.

21. The color effect material of claim 16, wherein the third encapsulating layer is chromium oxide.

22. The color effect material of claim 21, wherein the chromium oxide is deposited by chemical vapor deposition from a chromium carbonyl.

23. The color effect material of claim 16, wherein the third encapsulating layer is titanium dioxide.

24. The color effect material of claim 23, wherein the titanium dioxide is deposited by chemical vapor deposition from a titanium halide or titanium alkoxide.

25. The color effect material of claim 24, wherein the titanium halide is titanium tetrachloride and the titanium alkoxide is titanium (IV) isopropoxide.

26. The color effect material of claim 16, wherein the third encapsulating layer is titanium nitride.

27. The color effect material of claim 26, wherein the titanium nitride is deposited by chemical vapor deposition from tetrakis(dimethyl-amido)titanium and/or tetrakis(diethyl-amido) titanium.

28. The color effect material of claim 16, wherein the third encapsulating layer is aluminum.

29. The color effect material of claim 16, wherein the aluminum is deposited by chemical vapor deposition from tri-isobutyl aluminum.

30. A color effect material of claim 2, wherein the substrate is platelet shaped mica, the highly reflective first encapsulating layer is silicon, the second encapsulating layer is silicon dioxide and the third encapsulating layer is silicon.

31. A color effect material of claim 2, wherein the substrate is platelet shaped glass flake, the highly reflective first encapsulating layer is silicon, the second encapsulating layer is silicon dioxide and the third encapsulating layer is silicon.

32. A color effect material of claim 2, wherein the substrate is platelet shaped titanium dioxide coated mica, the highly reflective first encapsulating layer is silicon, the second encapsulating layer is silicon dioxide and the third encapsulating layer is silicon.

33. A color effect material of claim 2, wherein the substrate is platelet shaped mica, the highly reflective first encapsulating layer is aluminum, the second encapsulating layer is silicon dioxide and the third encapsulating layer is aluminum.

34. A color effect material of claim 2, wherein the substrate is platelet shaped titanium dioxide coated mica, the highly reflective first encapsulating layer is aluminum, the second encapsulating layer is silicon dioxide and the third encapsulating layer is aluminum.

35. A color effect material of claim 2, wherein the substrate is platelet shaped mica, the highly reflective first encapsulating layer is titanium nitride, the second encapsulating layer is silicon dioxide and the third encapsulating layer is titanium nitride.

36. A color effect material of claim 2, wherein the substrate is platelet shaped mica, the highly reflective first encapsulating layer is titanium nitride, the second encapsulating layer is silicon dioxide and the third encapsulating layer is titanium dioxide.

37. A color effect material of claim 2, wherein the substrate is platelet shaped mica, the highly reflective first encapsulating layer is titanium nitride, the second encapsulating layer is silicon dioxide and the third encapsulating layer is iron oxide.

38. A method of making a color effect material comprising:
  (a) encapsulating a platelet-shaped substrate with a first layer highly reflective to light directed thereon and selected from the group consisting of silicon, aluminum, titanium nitride and mixtures thereof;
  (b) encapsulating the first layer with a second layer providing a variable pathlength for light dependent on the angle of incidence of light impinging thereon; and
  (c) encapsulating the second layer with a third layer selectively transparent to light directed thereon.

39. The method of claim 38, wherein the substrate is selected from the group consisting of mica, aluminum oxide, bismuth oxychloride, boron nitride, glass flake, iron oxide-coated mica, silicon dioxide and titanium dioxide-coated mica.

40. The method of claim 39, wherein the second layer is selected from the group consisting of silicon dioxide and magnesium fluoride, and wherein the third layer is selected from the group consisting of silicon, iron oxide, chromium oxide, titanium dioxide, titanium nitride, a mixed metal oxide, aluminum, and mixtures thereof.

* * * * *